(12) United States Patent
Hayashi

(10) Patent No.: US 7,095,553 B2
(45) Date of Patent: Aug. 22, 2006

(54) OPTICAL AMPLIFIER AND CONTROLLING METHOD FOR RAMAN AMPLIFIER

(75) Inventor: Etsuko Hayashi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 10/895,315

(22) Filed: Jul. 21, 2004

(65) Prior Publication Data
US 2005/0219681 A1 Oct. 6, 2005

(30) Foreign Application Priority Data
Mar. 30, 2004 (JP) .................................... 2004-100795

(51) Int. Cl.
*H01S 3/00* (2006.01)

(52) U.S. Cl. ........................ 359/334; 359/341.4
(58) Field of Classification Search .............. 359/334, 359/341.3, 341.4
See application file for complete search history.

(56) References Cited

U.S. PATENT DOCUMENTS

| 6,587,260 B1 * | 7/2003 | Kikuchi et al. ............. 359/334 |
| 6,825,972 B1 * | 11/2004 | Emori et al. ................ 359/334 |
| 2001/0046083 A1 | 11/2001 | Akasaka et al. ............ 359/334 |
| 2004/0004756 A1 | 1/2004 | Hainberger et al. ....... 359/341.3 |

FOREIGN PATENT DOCUMENTS

| EP | 1 249 901 A2 | 10/2002 |
| EP | 1 330 055 A2 | 7/2003 |
| EP | 1 330 055 A3 | 8/2003 |
| EP | 1 249 901 A3 | 2/2005 |
| JP | 11-84440 | 3/1999 |

OTHER PUBLICATIONS

T. Tanaka, et al., "200–nm Bandwidth WDM Transmission Around 1.55 μm Using Distributed Raman Amplifier", 28th European Conference on Optical Communication (ECOC) 2002, Post–Deadline Papers, Post–deadline session 4: PD4.6, Sep. 8–12, 2002.
European Search Report dated Jun. 29, 2005 for European Patent Application No. 04 01 8359.2–2222.

* cited by examiner

*Primary Examiner*—Mark Hellner
(74) *Attorney, Agent, or Firm*—Staas & Halsey LLP

(57) ABSTRACT

There is provided an optical amplifier comprising a Raman amplifying section, a rare earth element doped fiber amplifying section to be disposed in the case where the number of operating channels exceeds the number of allowable channels A, and a control section. And the control section controls the wavelength of pumping light of the Raman amplifying section such that the signal light of the entire band is able to be amplified, in the case where the number of operating channels is equal to that of allowable channels A or less, and whereas the control section controls the wavelength of pumping light of the Raman amplifying section such that the signal light of the band located out of the amplifying band of the rare earth element doped fiber amplifier is able to be amplified, in the case where the number of operating channels becomes greater than the number of allowable channels A.

25 Claims, 11 Drawing Sheets

OPTICAL AMPLIFIER AND CONTROLLING METHOD FOR RAMAN AMPLIFIER

CROSS REFERENCE TO RELATED APPLICATIONS

This application is based on and hereby claims priority to Japanese Application No. 2004-100795 filed on Mar. 30, 2004 in Japan, the contents of which are hereby incorporated by reference.

BACKGROUND OF THE INVENTION (1) Field of the Invention

The present invention relates to an optical amplifier used for an optical fiber transmission system and an optical signal processing system at various optical communication systems, in particular, suitably used for amplifying wavelength multiplexed light, and a controlling method for a Raman amplifier.

(2) Description of the Related Art

At present, as an optical amplifier for amplifying wavelength-multiplexed light, a rare earth element doped fiber amplifier is in general use. In particular, an erbium doped fiber amplifier (referred to as EDFA hereinafter) for C band whose amplifying band is 1530 to 1560 nm and an EDFA for L band whose amplifying band is 1570 to 1610 nm are well known for the fact that they exhibit excellent amplifying characteristics such as high pumping efficiency and low noise characteristic.

On the other hand, one of the problems to be solved for increasing the transmission capacity at a wavelength division multiplexing (WDM) optical transmission system is the expansion of band of the optical amplifier.

In order to expand the band, as shown in FIG. 11(a), two EDFAs mentioned above are connected in parallel by using an optical multiplexer and de-multiplexer (CL multiplexer, CL de-multiplexer) called a CL coupler.

In this regard, as shown in FIG. 11(b), an optical amplifier having an amplifying band of 1530 to 1610 nm has already been proposed and has been put to practical use as a commercial product.

However, there are three problems at this optical amplifier in which two EDFAs are connected in parallel by using the CL coupler. The first problem (1) is the deterioration of noise characteristic (noise factor) caused by inserting the CL coupler. The second problem (2) is the high cost caused by using two kinds of optical amplifiers being the EDFA for C band and the EDFA for L band. The third problem (3) is the high cost caused at the time when the number of operating channels is small, for example, at the initial installation stage.

To cope with the problems (1), (2) among those problems, expanding the amplifying band by one optical amplifier has been studied. It has been proposed that, for example, at the Raman amplifier in which an arbitrary amplifying band and an arbitrary amplifying bandwidth can be set, the bandwidth is expanded by multiplexing plural pumping wavelengths; the bandwidth is expanded by using a hybrid amplifier, combining an EDFA being well-established, in spite of being limited somewhat in the bandwidth, with a Raman amplifier, so as to constitute a hybrid amplifier (for example, in Japanese Patent Application Laid-Open No. HEI 11-84440); the bandwidth is expanded by using an EDF (erbium doped fiber) being multi-component glass.

However, expanding the bandwidth by using the multi-component glass poses several problems from the viewpoint of the reliability and the high non-linearity of the EDF. Therefore, in order to realize the expansion of the bandwidth, the Raman amplifier becomes a key amplifier.

In connection with the expansion of the bandwidth by using the Raman amplifier, the possibility of amplifying 200 nm bandwidth has been reported (refer to Toshiki Tanaka et al. "200-nm Bandwidth WDM Transmission around 1.55 μm using Distributed Raman Amplifier", 28th European Conference on Optical Communication (ECOC) 2002, Post-Deadline Papers, Post-deadline session 4:PD4.6). However, the Raman amplifier has lower pumping efficiency than the rare earth element doped fiber amplifier. Therefore, at the Raman amplifier, larger pumping light power is required and the cost becomes high.

SUMMARY OF THE INVENTION

However, at present, there has not been taken any action for solving the third problem mentioned above, that is, any action, for coping with the problem of the high cost at the time when the number of operating channels is small at the broadband optical amplifier.

As mentioned above, in the case where the Raman amplifier is used, the cost becomes higher, as compared with a case where a rare earth element doped fiber amplifier is used, therefore, it is necessary that the cost is made low as much as possible.

Especially, at the Raman amplifier, regardless of the number of operating channels, providing in advance a pumping light source being capable of obtaining necessary pumping light power for the case where the number of operating channels becomes a maximum value is a matter of common practice. Therefore, it is difficult to reduce the cost (initial installation cost) at the time when the number of operating channels is small such as at the initial installation time.

Moreover, in case of the hybrid amplifier, the EDFA has been installed at the initial installation time, and regardless of the number of operating channels, the pumping light power is set to be a constant value, therefore, it is difficult to reduce the initial installation cost.

Furthermore, a Raman amplifier whose pumping wavelengths are fixed is generally used, therefore, excessive pumping light power is required depending on the signal wavelength and the signal configuration whereby this also causes the high cost. Especially, when the pumping wavelengths are fixed, it is necessary to increase excessively the pumping light power corresponding to the increase of the number of operating channels.

It is therefore an object of the present invention to provide an optical amplifier and a controlling method for a Raman amplifier, in which pumping light power can be reduced at the time when the number of operating channels is small for example at the initial installation time and a pumping light source cost occupying the greater part of the cost of the optical amplifier can be reduced at the time when the number of operating channels is small for example at the initial installation time.

According to the present invention, for achieving the object mentioned above, there is provided an optical amplifier, comprising a Raman amplifying section being capable of amplifying signal light of the entire band being composed of an amplifying band of a rare earth element doped fiber amplifier and a band, which can have the number of allowable channels A, located out of the amplifying band; a rare earth element doped fiber amplifying section to be disposed in the case where the number of operating channels exceeds the number of allowable channels A; and a control section.

Thereupon the control section controls the wavelength of pumping light of the Raman amplifying section such that the signal light of the entire band is able to be amplified, in the case where the number of operating channels is equal to that of allowable channels A or less.

On the other hand, the control section controls the wavelength of pumping light of the Raman amplifying section such that the signal light of the band located out of the amplifying band of the rare earth element doped fiber amplifier is able to be amplified, in the case where the number of operating channels becomes greater than the number of allowable channels A. Thereby, the Raman amplifying section amplifies the signal light of the band located out of the amplifying band of the rare earth element doped fiber amplifier. On the other hand, the signal light of the amplifying band of the rare earth element doped fiber amplifier is amplified by the rare earth element doped fiber amplifying section.

According to the present invention, for achieving the object mentioned above, there is provided a controlling method for a Raman amplifier, being capable of amplifying signal light of the entire band being composed of an amplifying band of a rare earth element doped fiber amplifier and a band, which can have the number of allowable channels A, located out of the amplifying band, the method comprising the steps of:controlling the wavelength of pumping light of the Raman amplifier such that the signal light of the entire band is able to be amplified, in the case where the number of operating channels is equal to that of allowable channels A or less; on the other hand, controlling the wavelength of pumping light of the Raman amplifier such that the signal light of the band located out of the amplifying band of the rare earth element doped fiber amplifier is able to be amplified, in the case where the number of operating channels becomes greater than the number of allowable channels A.

Therefore, according to the present invention, the pumping light power and the cost of a pumping light source occupying the greater part of the optical amplifier can be reduced at the time when the number of operating channels is small such as at the initial installation time.

DESCRIPTION OF THE PREFERRED EMBODIMENTS

Figure 1:
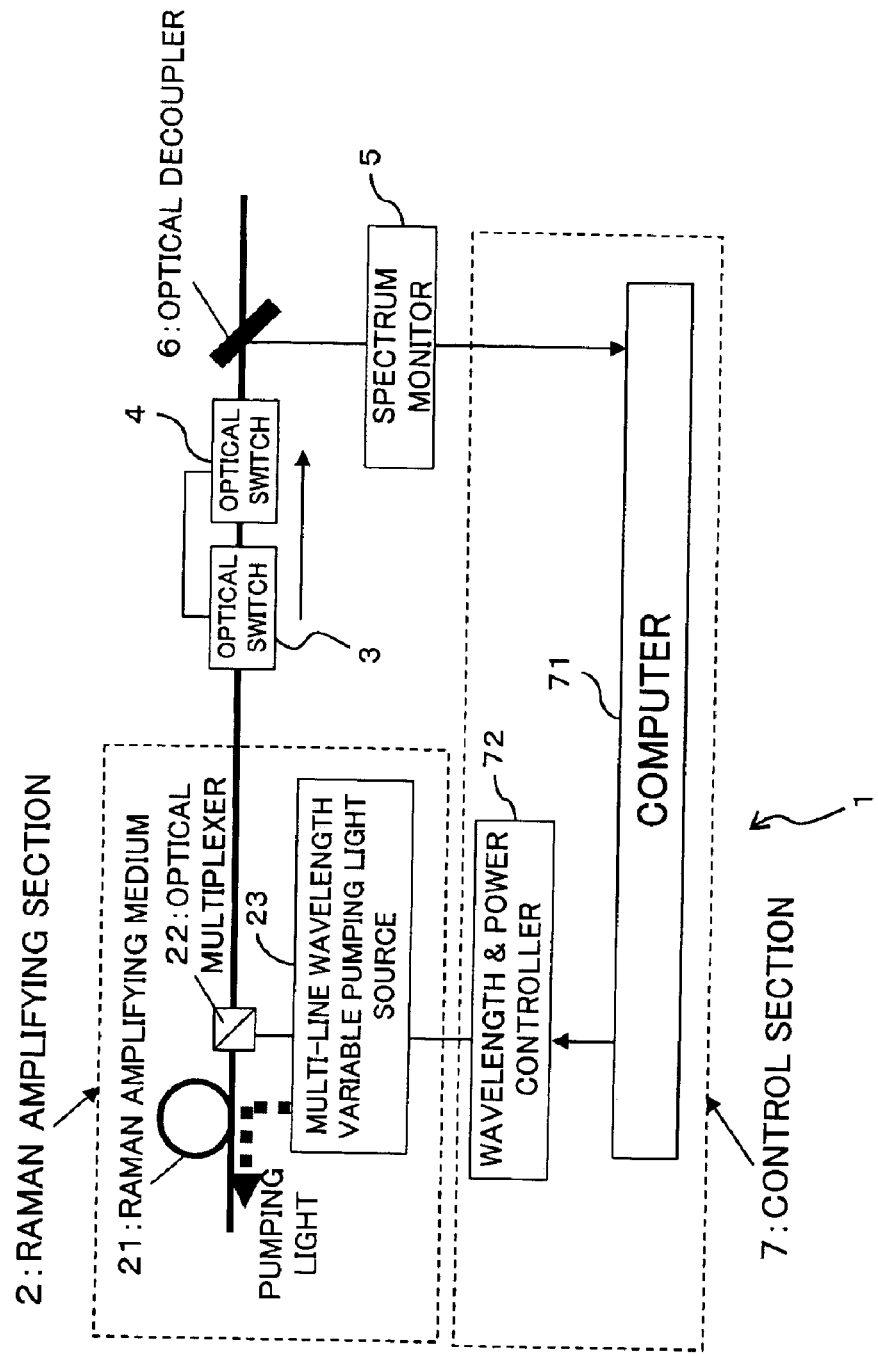
FIG. 1 is a schematic view showing the entire structure of an optical amplifier at an embodiment of the present invention.

Referring now to the drawings, an optical amplifier and a controlling method for a Raman amplifier at an embodiment of the present invention are explained.

As shown in FIG. 1, the optical amplifier (broadband optical amplifier) according to the embodiment of the present invention is constitutionally provided with a Raman amplifying section (Raman amplifier) 2, two optical switches 3 and 4 which can be connected to a rare earth element doped fiber amplifying section (rare earth element doped fiber amplifier), an optical spectrum monitor 5 which can monitor optical output power every wavelength for example an optical spectrum analyzer, an optical decoupler (divider) 6 for inputting the signal light (output light) to the optical spectrum monitor 5 with for example one tenth of the intensity of the signal light, and a control section 7 for controlling a pumping light wavelength (also referred to as pumping wavelength) and pumping light power of the Raman amplifying section 2.

Figure 3:
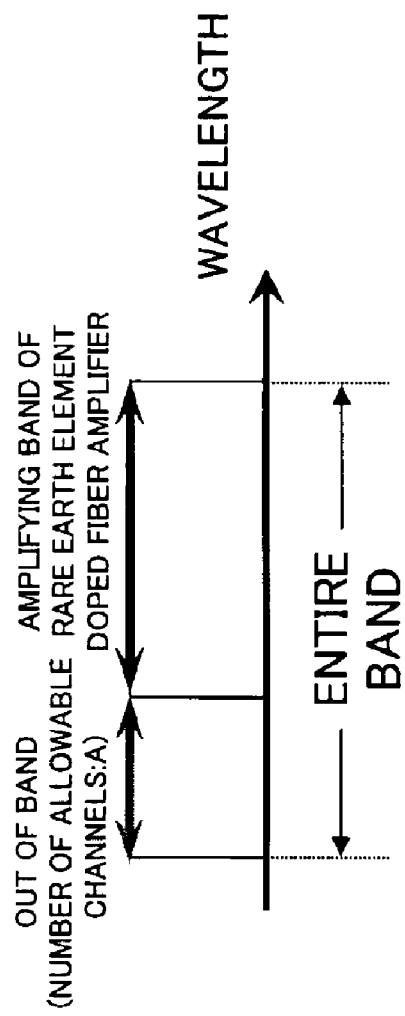
FIG. 3 is a schematic view for explaining an amplifying band of the optical amplifier according to the embodiment of the present invention.

Here, as shown in FIG. 3, the Raman amplifying section 2 is configured to be able to amplify the signal light of the entire band being composed of the amplifying band of the rare earth element doped fiber amplifier (for example, EDFA) and the band being adjacent to this amplifying band (the band located out of the amplifying band of the rare earth element doped fiber amplifier). That is, the entire band, which the Raman amplifying section 2 can amplify, is composed of the amplifying band of the rare earth element doped fiber amplifier and the additional band being adjacent to this amplifying band. The additional band is the band located out of the rare earth element doped fiber amplifier.

Here, it is assumed that the number of allowable channels insertable into the band (additional band) located out of the amplifying band of the rare earth element doped fiber amplifier is A. And it is preferable that the ratio of the bandwidth of the amplifying band of the rare earth element doped fiber amplifier to that of this band located out of the amplifying band is approximately 2:1.

For example, it suffices to configure the Raman amplifying section 2 such that it is able to amplify the signal light of the entire band being composed of the amplifying band of the EDFA (for example, C band whose amplifying band is 1530 to 1560 nm and L band whose amplifying band is 1570 to 1610 nm) and the band on the short wavelength side being adjacent to this amplifying band.

Specifically, as shown in FIG. 1, the Raman amplifying section 2 is constituted to be provided with an amplifying medium (Raman amplifying medium) 21 for Raman amplification, an optical multiplexer (coupler) 22 for multiplexing the signal light and the pumping light, and a wavelength variable pumping light source 23 for Raman amplification.

Here, the wavelength variable pumping light source 23 is a pumping light source being capable of changing its pumping light wavelength. For example, it is desirable that a multi-line wavelength variable pumping light source, which can output pumping light of plural different wavelengths by one laser light source, for example, a multi-line Raman laser, is used as the wavelength variable pumping light source 23. Besides, there can also be used a single-line pumping light source (in which plural laser light sources are provided and plural different wavelength pumping light outputted from each laser light source is multiplexed by a variable multiplexer).

As mentioned here in after, by using the wavelength variable pumping light source 23, not only the relocation of the pumping light wavelength corresponding to the number of operating channels can be executed, but also the relocation of the pumping light wavelength for securing the gain flatness can be executed. That is, at the conventional Raman amplifier, the pumping wavelengths are fixed, and it is necessary that the number of the pumping wavelengths be set to be about 2 to 5 in consideration of the cost. However, in the case where a broad amplifying band is to be intended to be obtained, it is difficult to secure the gain flatness even by disposing the pumping wavelengths in a most suitable state by using about 2 to 5 pumping light wavelengths. On the contrary, by using the wavelength variable pumping light source 23, as mentioned hereinafter, the gain flatness can be secured by executing the wavelength control and the power control.

The control section 7 is configured to be provided with a computer (for example, DSP (Digital Signal Processor), CPU (Central Processing Unit)) 71, and a wavelength and power controller 72 for controlling the pumping light wavelength and the pumping light power of the pumping light source 23 in the Raman amplifying section 2. According to the embodiment of the present invention, especially, the control section 7 controls the pumping light power and the pumping light wavelength of the Raman amplifying section 2 such that the output deviation in the entire band of a broadband optical amplifier 1 becomes equal to a predetermined value or less.

In the case where the number of operating channels is equal to the number of allowable channels A or less, the pumping light wavelengths of the Raman amplifying section 2 are controlled by the control section 7 such that the signal light of the entire band can be amplified. Thereby, the Raman amplifying section 2 amplifies the signal light of the entire band.

In the case where the number of operating channels has been greater than the number of allowable channels A after the channels being added, the pumping light wavelengths of the Raman amplifying section 2 are controlled by the control section 7 such that the signal light of the band located out of the amplifying band of the rare earth element doped fiber amplifier can be amplified. Thereby, the Raman amplifying section 2 amplifies the signal light of the band located out of the amplifying band of the rare earth element doped fiber amplifier.

Figure 2:
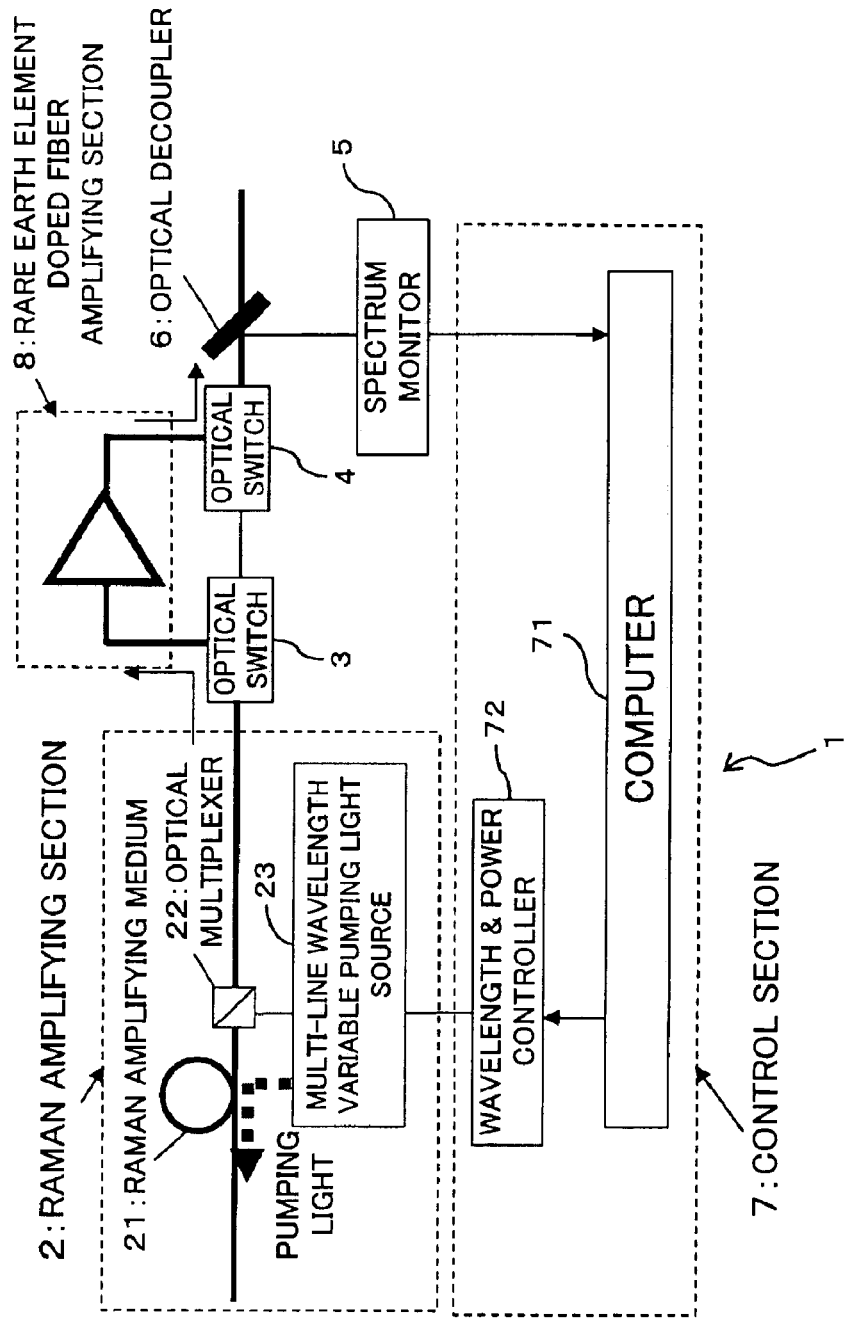
FIG. 2 is a schematic view showing the entire structure of the optical amplifier according to the embodiment of the present invention, wherein a rare earth element doped fiber amplifying section is added.

On the other hand at the optical amplifier 1 of the present invention, in the case where the number of operating channels becomes greater than the number of allowable channels A after the channels being added, as shown in FIG. 2, a rare earth element doped fiber amplifying section (for example, an erbium doped fiber amplifying section) 8 is added on a bypath section of the optical transmission line via the two optical switches 3 and 4 for switching over the route. Thereby, the signal light of the amplifying band of the rare earth element doped fiber amplifier is amplified by the rare earth element doped fiber amplifying section 8.

This is attributed to the circumstances mentioned hereinafter. In the case where the number of operating channels becomes greater than A wherein the number of allowable channels in the band located out of the amplifying band of the rare earth element doped fiber amplifier is A some channels certainly fall within the amplifying band of the rare earth element doped fiber amplifier, whereupon the signal light of the channels can be amplified at the rare earth element doped fiber amplifying section 8. That is, in the case where the number of operating channels has become greater than A on occurrence of the circumstances allowing to utilize the rare earth element doped fiber amplifying section 8 whose pumping efficiency is higher than that of the Raman amplifying section 2 is to be used. Thereby, it becomes possible that necessary pumping light power of the broadband optical amplifier is made as low as possible.

Incidentally, in the case where the number of operating channels becomes greater than the number of allowable channels A the rare earth element doped fiber amplifying section 8 is added, however, the present invention is not limited to this structure. For example, the rare earth element doped fiber amplifying section 8 is disposed in parallel with the optical transmission line via the switches provided beforehand, and in the case where the number of operating channels becomes greater than the number of allowable channels A the route is switched over by the switches, and the rare earth element doped fiber amplifying section 8 comes to be in a state to be able to fulfill its substantial functionality. Therefore, the case, in which the rare earth element doped fiber amplifying section 8 is disposed when the number of operating channels becomes greater than the number of allowable channels A covers not only the case where the rare earth element doped fiber amplifying section 8 is added but also the case the rare earth element doped fiber amplifying section 8 has been disposed beforehand in parallel with the optical transmission line via the switches and the route is switched over by the switches and the rare earth element doped fiber amplifying section 8 comes to be in a state to fulfill its substantial functionality.

Further, here, the rare earth element doped fiber amplifying section 8 is connected to the optical transmission line in parallel via the switches. However, although for example, in the case where it is not necessary to add a wavelength in service (in an operating state), wherein it is not necessary to switch over the route by the switches, it is also possible that the rare earth element doped fiber amplifying section 8 is connected in series to the Raman amplifying section 2.

As mentioned above, according to the embodiment of the present invention, since it is enough that the signal light of channels A (the signal light of operating channels) can be amplified at most by the Raman amplifying section 2, it is enough that the pumping light source in the Raman amplifying section 2 is configured to be capable of outputting the pumping light, which can only amplify the signal light of the number of channels A. That is, it is enough that the power of the pumping light source in the Raman amplifying section 2 is set to the power that can only amplify the signal light of the number of channels A. Therefore, the output (pumping light power) of the pumping light source in the Raman amplifying section 2 can be reduced, as compared with a structure in which the pumping light source in the Raman amplifying section 2 is set to the extent of enabling to output the necessary pumping light power at the time when the largest channels are inserted into the entire band.

Moreover, according to the embodiment of the present invention, the output (pumping light power) of the pumping light source in the Raman amplifying section 2 is set as follows.

Generally, the Raman amplifier has a characteristic that the pumping efficiency is lowered at the band on the short wavelength side. Therefore, the band located out of the amplifying band of the rare earth element doped fiber amplifier is set to be the band located on the short wavelength side, whereby, when the channels of the number of allowable channels A are inserted into the band on this short wavelength side, the largest output (pumping light power) of the pumping light source is required. Therefore, according to the embodiment of the present invention, in the case where the channels of the number of allowable channels A are inserted into the band located out of the amplifying band of the rare earth element doped fiber amplifier, the output (pumping light power) of the pumping light source in the Raman amplifying section 2 is set such that the pumping light source can output the pumping light being required to amplify the entire channels (the entire signal light). With this setting, there can be taken actions correspond to either of both cases, i.e. the case where the number of operating channels is equal to the number of allowable channels A or less, and the case where the number of operating channels becomes greater than the number of allowable channels A.

Furthermore, according to the embodiment of the present invention, the pumping light wavelength outputted from the wavelength variable pumping light source 23 is controlled by the control section 7, and the relocation of the pumping light wavelength is executed. Thereby, the output (pumping light power) of the pumping light source in the Raman amplifying section 2 can be further lowered.

Figure 4:
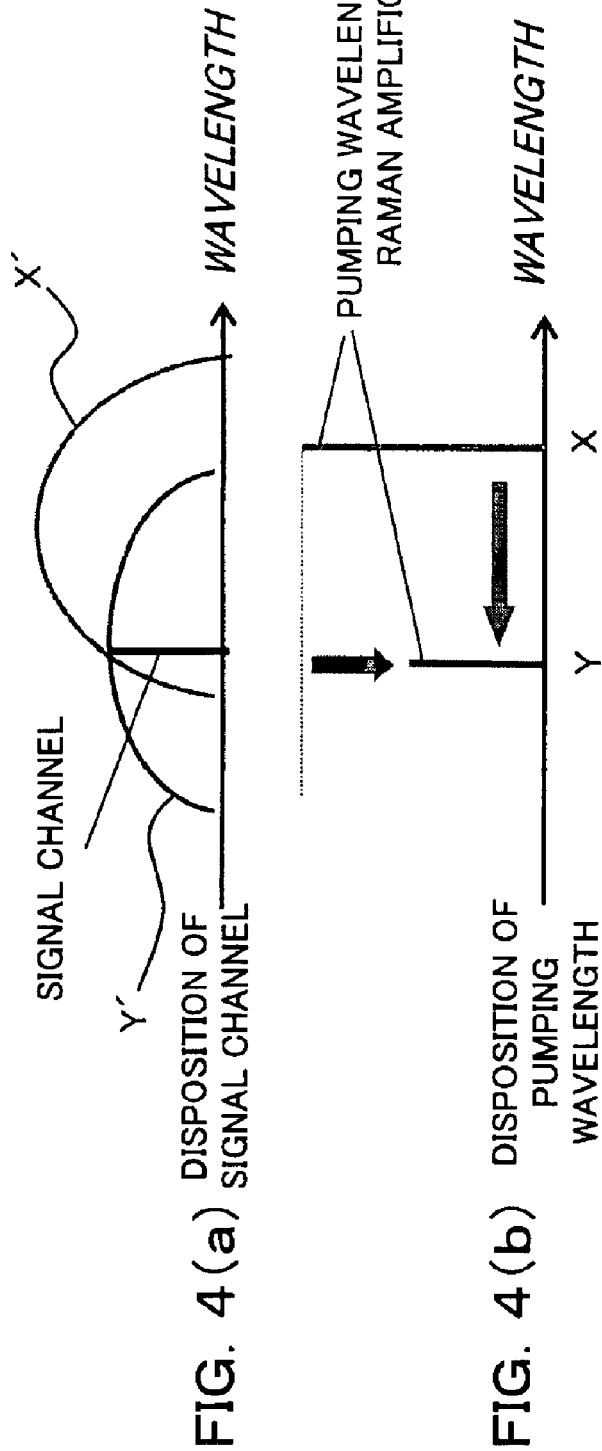
FIGS. 4(a) and (b) is a schematic view for explaining relocation of a pumping light wavelength at the optical amplifier according to the embodiment of the present invention.

Referring to FIGS. 4(*a*) and 4(*b*), the outline of the relocation of the pumping wavelength is explained. FIG. 4(*a*) shows the disposition of a signal channel being disposed arbitrarily and a Raman amplifying band in accordance with one pumping light wavelength, and FIG. 4(*b*) shows the disposition of pumping wavelength.

As shown in FIG. 4(*b*), when the pumping wavelength was disposed at the wavelength λ, the Raman amplifying band in accordance with this pumping wavelength comes to be in the state shown by the sign X' in FIG. 4(*a*). As a consequence, the signal channel is disposed at the position shown in FIG. 4(*a*), and the position is out of the gain peak of the Raman amplifying band in accordance with the pumping wavelength of the wavelength x, therefore, the utilizing efficiency of the pumping light power is low (the utilizing efficiency depends on the conditions but that is lowered by about 10%, compared with the most effectively utilized case) and higher pumping light power is required.

On the other hand, as shown in FIG. 4(*b*), when the pumping wavelength was disposed at the wavelength Y, the Raman amplifying band in accordance with this pumping wavelength comes to be in the state shown by the sign Y' in FIG. 4(*a*). In this case, the signal channel is disposed at the gain peak position of the Raman amplifying band (Raman gain) by the pumping wavelength of the wavelength Y, therefore, the pumping light power effectively contributes to the Raman amplification and only lower pumping light power is enough.

Therefore, when, in case of the pumping wavelength having been disposed at the wavelength λ, the pumping wavelength is relocated at the wavelength Y, the output (pumping light power) of the pumping light source in the Raman amplifying section 2 can be further lowered. As mentioned above, the pumping light disposing the pumping light wavelength most suitably for the disposition of the signal channel can reduce power.

Figure 5:
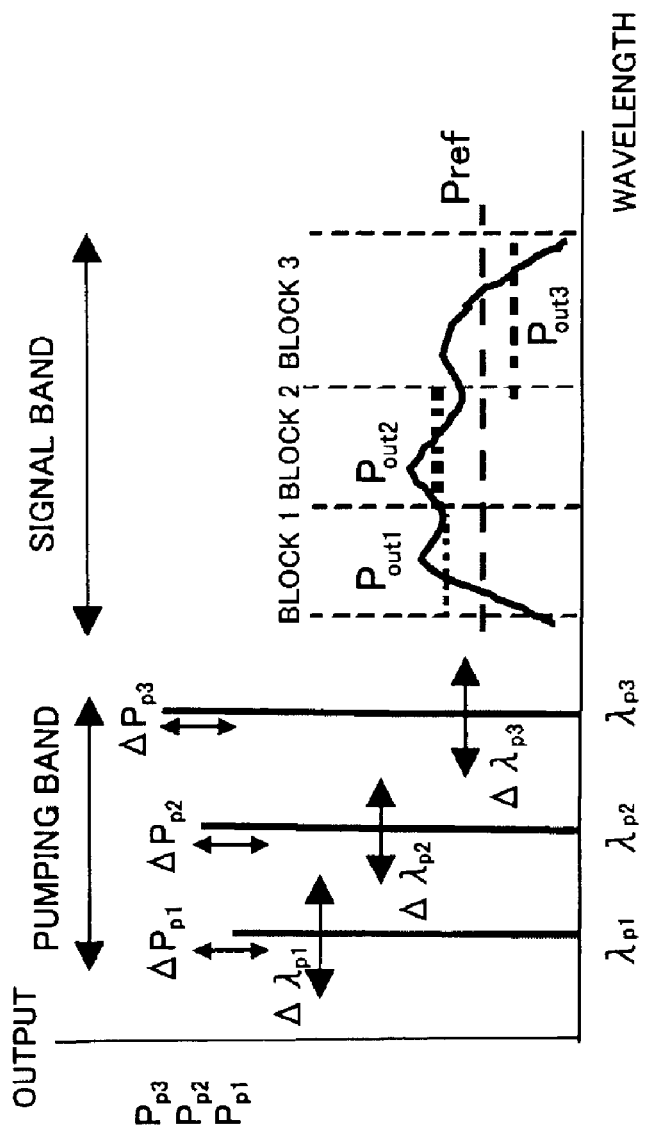
FIG. 5 is a diagram for explaining pumping light wavelength control and pumping light power control at the optical amplifier according to the embodiment of the present invention.
Figure 6:
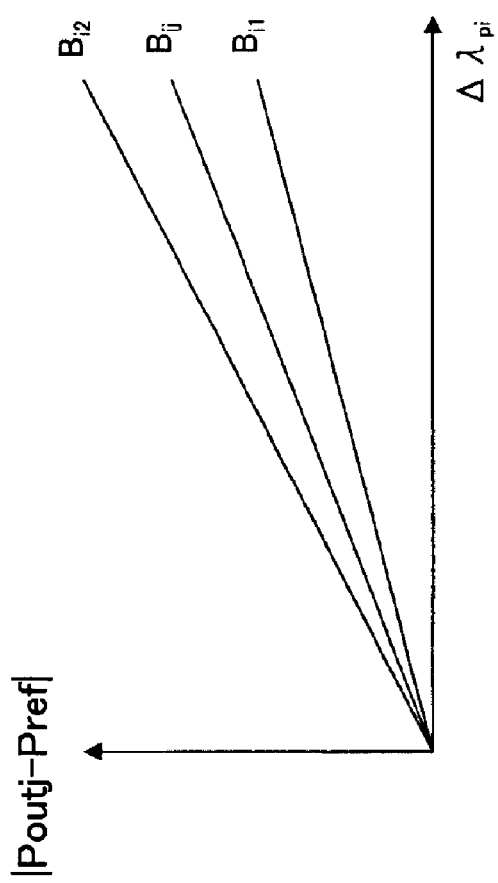
FIG. 6 is a graph for explaining the pumping light wavelength control and the pumping light power control at the optical amplifier according to the embodiment of the present invention.

Next, referring to FIGS. 5 and 6, in order to relocate the pumping wavelength, the calculation of the pumping light wavelength and the pumping light power being executed by the computer 71 in the control section 7, and the control for the wavelength variable pumping light source 23 in the Raman amplifying section 2 being executed by the wavelength and power controller 72 in the control section 7 are explained.

As shown in FIG. 5, here, it is assumed that the number of wavelengths being outputted from the wavelength variable pumping light source 23 in the Raman amplifying section 2 is three, and the three pumping light wavelengths are denoted as $\lambda_{p1}$, $\lambda_{p2}$, and $\lambda_{p3}$. And the band including these pumping light wavelengths is called the pumping band, and the band of the signal light to be amplified by these three pumping light is called the signal band (amplifying band). Further, here, the signal band is divided into three blocks, and the three blocks are denoted as the block 1, the block 2 and the block 3, and the average values of the optical output power (average optical output power) of the entire signal light being included in each of the blocks 1, 2 and 3 are denoted as $P_{out1}$, $P_{out2}$, and $P_{out3}$ respectively. And the desired average value of the optical output power (desired average optical output power:desired optical output power) of the entire signal light being included in the signal band is denoted as $P_{ref}$. Here, the desired average optical output power $P_{ref}$ shows the same value of the average optical output power of the rare earth element doped fiber amplifying section 8, in the case where the rare earth element doped fiber amplifying section 8 is added.

In the case where each of the pumping light wavelengths $\lambda_{p1}$, $\lambda_{p2}$, and $\lambda_{p3}$ ($\lambda_{pi}$:i is the wavelength number) is changed in the range $\Delta\lambda_{p1}$, $\Delta\lambda_{p2}$, and $\Delta\lambda_{p3}$ ($\Delta\lambda_{pi}$:i is the wavelength number) respectively, the deviations $|P_{out1}\text{-}P_{ref}|$, $|P_{out2}\text{-}P_{ref}|$, and $|P_{out3}\text{-}P_{ref}|$ ($|P_{outj}\text{-}P_{ref}|$:j is the block number) of the average optical output power $P_{out1}$, $P_{out2}$, and $P_{out3}$ of each block ($P_{outj}$:j is the block number) from the desired average optical output power $P_{ref}$ are changed respectively. These relations can be shown in the following equation (1).

$$\begin{pmatrix} |P_{out1} - P_{ref}| \\ |P_{out2} - P_{ref}| \\ |P_{out3} - P_{ref}| \end{pmatrix} = \begin{pmatrix} B_{11} B_{12} B_{13} \\ B_{21} B_{22} B_{23} \\ B_{31} B_{32} B_{33} \end{pmatrix} \begin{pmatrix} \Delta\lambda_{p1} \\ \Delta\lambda_{p2} \\ \Delta\lambda_{p3} \end{pmatrix} \quad (1)$$

Still, the matrix $B_{ij}$ [i:pumping light wavelength number (in this case, 1 to 3), j:block number (in this case, 1 to 3)] is the coefficient showing the change of the deviations $|P_{out1}\text{-}P_{ref}|$, $|P_{out2}\text{-}P_{ref}|$, and $|P_{out3}\text{-}P_{ref}|$ ($|P_{outj}\text{-}P_{ref}|$) of the average optical output power $P_{out1}$, $P_{out2}$, and $P_{out3}$ ($P_{outj}$) from the desired average optical output power $P_{ref}$, in the case where each of the pumping light wavelengths $\lambda_{p1}$, $\lambda_{p2}$, and $\lambda_{p3}$ is individually changed in the range $\Delta\lambda_{p1}$, $\Delta\lambda_{p2}$, and $\Delta\lambda_{p3}$.

It is enough that the matrix $B_{ij}$ is calculated beforehand in a manner mentioned hereinafter and its calculated result is stored in the memory of the computer 71.

For example, the matrix $B_{ij}$ is obtained as the gradient of the line showing the change of the deviations $|P_{out1}\text{-}P_{ref}|$, $|P_{out2}-P_{ref}|$, and $|P_{out3}-P_{ref}|(|P_{outj}-P_{ref}|)$ of the average optical output power $P_{out1}$, $P_{out2}$, and $P_{out3}$ ($P_{outj}$) of each of the blocks 1, 2, and 3 from the desired average optical output power $P_{ref}$ for the obtained $\Delta\lambda_{pi}$ when the wavelength $\lambda_{pi}$ is changed in the range $\Delta\lambda_{pi}$ by inputting the pumping light of the wavelength $\lambda_{pi}$ one by one (refer to FIG. 6).

Still, at first, in the case where the wavelength is changed in the range $\Delta\lambda_{pi}$, pumping light of wavelength whose deviation of the average optical output power $P_{outj}$ from the desired average optical output power $P_{ref}$ is the smallest one is inputted (default pumping light). After this, the wavelength is gradually changed and the deviations $|P_{out1}-P_{ref}|$, $|P_{out2}-P_{ref}|$, and $P_{out3}-P_{ref}|(|P_{outj}-P_{ref}|)$ of the average optical output power $P_{out1}$, $P_{out2}$, and $P_{out3}$ ($P_{outj}$) of each of the blocks 1, 2, and 3 from the desired average optical output power $P_{ref}$ are obtained. Therefore, as the range $\Delta\lambda_{pi}$ becomes larger, the deviations $|P_{out1}-P_{ref}|$, $|P_{out2}-P_{ref}|$, and $|P_{out3}-P_{ref}|(|P_{outj}-P_{ref}|)$ of the average optical output power $P_{out1}$, $P_{out2}$, and $P_{out3}$ ($P_{outj}$) of each of the blocks 1, 2, and 3 from the desired average optical output power $P_{ref}$ become larger.

Therefore, in the case where the relocation of the pumping light wavelength is executed, the control section 7 controls the pumping light wavelength outputted from the wavelength variable pumping light source 23 in the Raman amplifying section 2 based on the $\Delta\lambda_{pi}$ calculated by using the equation (1) mentioned above. That is, the $\Delta\lambda_{pi}$ is calculated by using the equation (1) at the computer 71 in the control section 7, and the wavelength and power controller 72 controls the pumping light wavelength outputted from the wavelength variable pumping light source 23 in the Raman amplifying section 2 based on the calculated $\Delta\lambda_{pi}$. The specific controlling method (control algorithm) for the pumping light wavelength control is explained later.

Furthermore, according to the embodiment of the present invention, in addition to the pumping light wavelength control mentioned above, the pumping light power control can be executed. At the pumping light power control, basically, almost the same control for the pumping light wavelength control mentioned above is executed.

As shown in FIG. 5, in the case where each of the pumping light power $P_{p1}$, $P_{p2}$, and $P_{p3}$ ($P_{pi}$:i is the wavelength number) is changed in the range $\Delta P_{p1}$, $\Delta P_{p2}$, and $\Delta P_{p3}$($P_{pi}$:i is the wavelength number) respectively, the deviations $|P_{out1}-P_{ref}|$, $|P_{out2}-P_{ref}|$, and $|P_{out3}-P_{ref}|(|P_{outj}-P_{ref}|$:j is the block number) of the average optical output power $P_{out1}$, $P_{out2}$, and $P_{out3}$ of each block ($P_{outj}$:j is the block number) from the desired average optical output power $P_{ref}$ are changed respectively. These relations can be shown in the following equation (2).

$$\begin{pmatrix} |P_{out1}-P_{ref}| \\ |P_{out2}-P_{ref}| \\ |P_{out3}-P_{ref}| \end{pmatrix} = \begin{pmatrix} A_{11}A_{12}A_{13} \\ A_{21}A_{22}A_{23} \\ A_{31}A_{32}A_{33} \end{pmatrix} \begin{pmatrix} \Delta P_{p1} \\ \Delta P_{p2} \\ \Delta P_{p3} \end{pmatrix} \quad (2)$$

Still, the matrix $A_{ij}$ [i:pumping light wavelength number (in this case, 1 to 3), j:block number (in this case, 1 to 3)] is the coefficient showing the deviations $|P_{out1}-P_{ref}|$, $|P_{out2}-P_{ref}|$, and $|P_{out3}-P_{ref}|(|P_{outj}-P_{ref}|$, j:block number) of the average optical output power $P_{out1}$, $P_{out2}$, and $P_{out3}$ ($P_{outj}$, j:block number) of each block 1, 2, and 3, from the desired average optical output power $P_{ref}$, in the case where each of the pumping light power $P_{p1}$, $P_{p2}$, and $P_{p3}$ is individually changed in the range $\Delta P_{p1}$, $\Delta P_{p2}$, and $\Delta P_{p3}$. It is enough that the matrix $A_{ij}$ is calculated beforehand in the same manner as the calculation manner of the matrix $B_{ij}$ mentioned above and its calculated result is stored in the memory of the computer 71.

Therefore, in the case where the pumping light power control is executed, the control section 7 controls the pumping light power outputted from the wavelength variable pumping light source 23 in the Raman amplifying section 2 based on the $\Delta P_{pi}$ calculated by using the equation (2) mentioned above. That is, the $\Delta P_{pi}$ is calculated by using the equation (2) at the computer 71 in the control section 7, and the wavelength and power controller 72 controls the pumping light power outputted from the wavelength variable pumping light source 23 in the Raman amplifying section 2 based on the calculated $\Delta P_{pi}$. The specific controlling method (control algorithm) for the pumping light power control is explained later.

In case of the pumping light wavelength control and the pumping light power control mentioned above, the same desired average optical output power $P_{ref}$ is used at the all blocks. However, the embodiment of the present invention is not limited to this, for example, it is possible that tilt control is executed by using different desired average optical output power $P_{ref}$ for each of blocks. Thereby, the gain flatness can be more surely realized.

Since the optical amplifier according to the embodiment of the present invention has the structure mentioned above, next, referring to FIG. 7, the processes at the time when the number of operating channels is added are explained. Still, the number of operating channels is assumed to be set to be equal to A or less, at the initial stage wherein there is introduced the optical transmission system having been the optical amplifier according to the embodiment of the present invention installed. First, when the number of operating channels is added, it is judged whether the number of entire operating channels is equal to the number of allowable channels A or less (step S1). For example, this judgment can be executed at the computer 71 in the control section 7, or by an operator.

In the case where the number of entire operating channels is equal to the number of allowable channels A or less, the signal light of the operating channels of the entire band is amplified by the Raman amplifying section 2, without adding the rare earth element doped fiber amplifying section 8. In this case, the optical amplifier 1 has the structure shown in FIG. 1.

Figure 7:
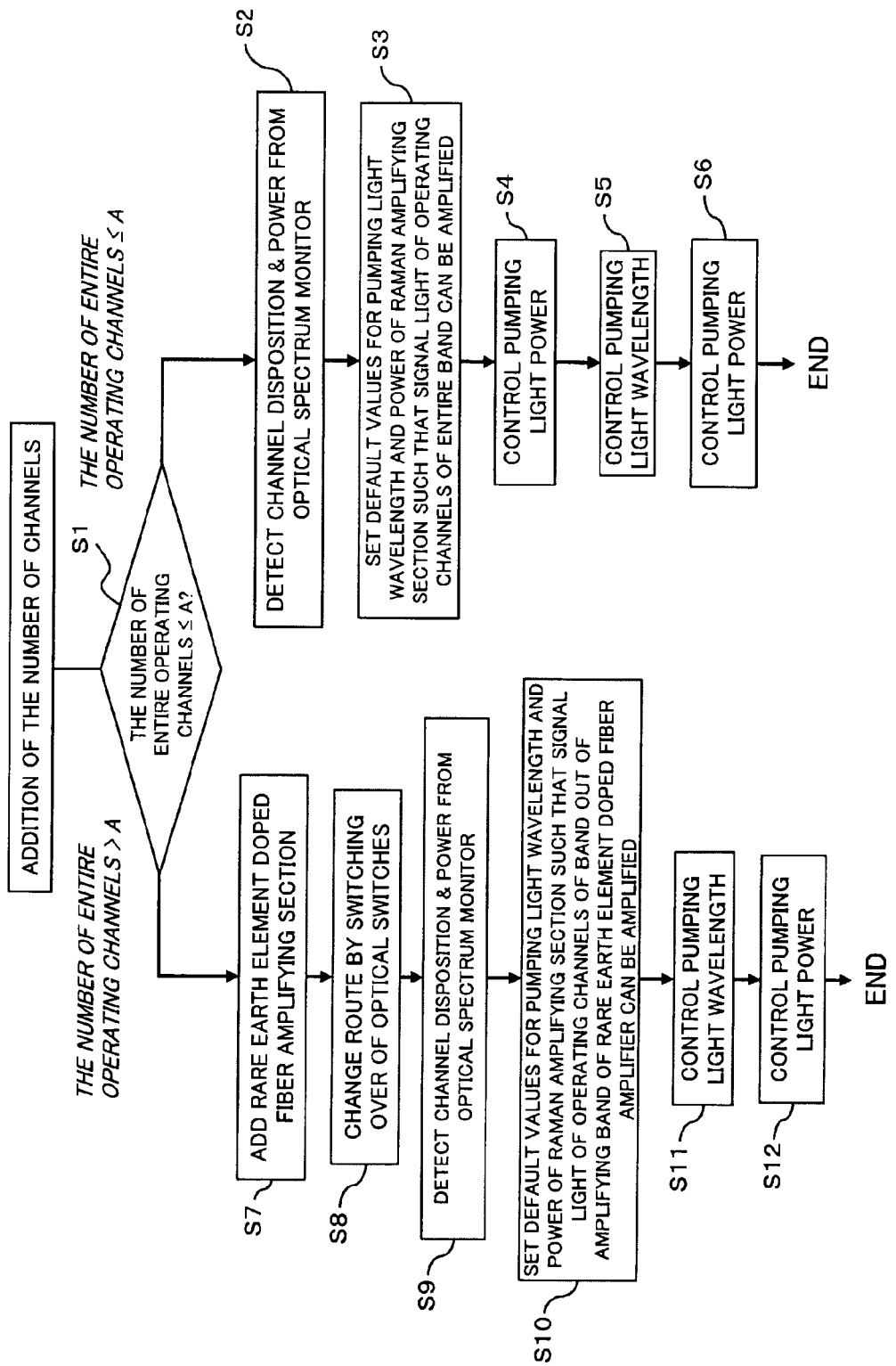
FIG. 7 is a flowchart for explaining processes (including a controlling method for a Raman amplifier) at the time when the number of channels is added at the optical amplifier according to the embodiment of the present invention.

In this case, the processes proceed to the route of the right side shown in FIG. 7, and the control section 7 obtains (detects) the channel disposition (the wavelengths of the operating channels) and their optical output power from the optical spectrum monitor 5 (step S2). And the computer 71 in the control section 7 reads out the pumping light wavelength being set as a default value (default pumping light wavelength) and the pumping light power being set as a default value (default pumping light power) corresponding to the wavelength and the power of the signal light of the operating channels being disposed arbitrarily in the entire band from the memory. Based on this, the wavelength and power controller 72 in the control section 7 controls the wavelength variable pumping light source 23 in the Raman amplifying section 2. By the process mentioned above, the pumping light wavelength and the pumping light power outputted from the wavelength variable pumping light source 23 are set to be the default pumping light wavelength and the default pumping light power (default values) that can amplify the signal light of the operating channels disposing arbitrarily in the entire band (step S3). After this, by the control section 7, the processes for the pumping light power control (step S4), the pumping light wavelength control (step S5), and the pumping light power control (step S6) for the wavelength variable pumping light source 23 in the Raman amplifying section 2 are executed sequentially. The contents of processes for the pumping light power control and the pumping light wavelength control will be explained later.

Here, there are executed the pumping light power control, the pumping light wavelength control, and the pumping light power control sequentially. However, the embodiment of the present invention is not limited to this, and the order, the combination and the number of times of this control can be set arbitrary. For example, it is possible that only the pumping light power control and the pumping light wavelength control are executed in order. On the contrary, it is possible that the pumping light wavelength control and the pumping light power control are executed in order.

On the other hand, in the case where the number of operating channels becomes greater than the number of allowable channels A, the rare earth element doped fiber amplifying section 8 is added, and the signal light of the operating channels in the entire band is amplified by the Raman amplifying section 2 and the rare earth element doped fiber amplifying section 8.

Therefore, the processes proceed to the route of the left side shown in FIG. 7, and the rare earth element doped fiber amplifying section 8 is added via the optical switches 3 and 4 (step S7). In the case where the rare earth element doped fiber amplifying section 8 is connected via the optical switches 3 and 4, the route is changed by switching over the optical switches 3 and 4 (step S8). In this case, the optical amplifier 1 has the structure shown in FIG. 2. Further, when the rare earth element doped fiber-amplifying section 8 is not connected via the optical switches 3 and 4, the step S8 is not necessary.

Next, in order that the signal light of the operating channels contained within the band located out of the amplifying band of the rare earth element doped fiber amplifier can be amplified by the Raman amplifying section 2, the control section 7 executes the relocation of the pumping light wavelengths, by controlling the changes of the pumping light wavelengths of the Raman amplifying section 2. That is, in the case where the number of operating channels is equal to the number of allowable channels A or less, the pumping light wavelengths of the Raman amplifying section 2 have been disposed such that the signal light of the entire operating channels being arbitrarily disposed in the entire band can be amplified. However, in the case where the number of operating channels becomes greater than the number of allowable channels A, the pumping light wavelengths are relocated such that the signal light of the operating channels contained within the band located out of the amplifying band of the rare earth element doped fiber amplifier can be amplifies by the Raman amplifying section 2.

Here the control section 7 obtains (detects) the channel disposition (the wavelengths of the operating channels) and their optical output power from the optical spectrum monitor 5 (step S9). And the computer 71 in the control section 7 reads out the pumping light wavelength being set as a default value (default pumping light wavelength) and the pumping light power being set as a default value (default pumping light power) corresponding to the wavelength and the power of the signal light of the operating channels contained within the band located out of the amplifying band of the rare earth element doped fiber amplifier from the memory. Based on this, the wavelength and power controller 72 in the control section 7 controls the wavelength variable pumping light source 23 in the Raman amplifying section 2. By the process mentioned above, the pumping light wavelength and the pumping light power outputted from the wavelength variable pumping light source 23 are set to be the default pumping light wavelengths ($\lambda_{o1}$ to $\lambda_{on}$) and the default pumping light power (default values) that can amplify the signal light of the operating channels contained within the band located out of the amplifying band of the rare earth element doped fiber amplifier (step S10).

After this, by the control section 7, the processes for the pumping light wavelength control (step S11) and the pumping light power control (step S12) for the wavelength variable pumping light source 23 in the Raman amplifying section 2 are executed sequentially. The contents of processes for the pumping light power control and the pumping light wavelength control will be explained later.

At the explanation mentioned above, the pumping light wavelength control and the pumping light power control are executed sequentially. However, the embodiment of the present invention is not limited to this, and the order, the combination and the number of times of these control can be set arbitrary.

Figure 8:
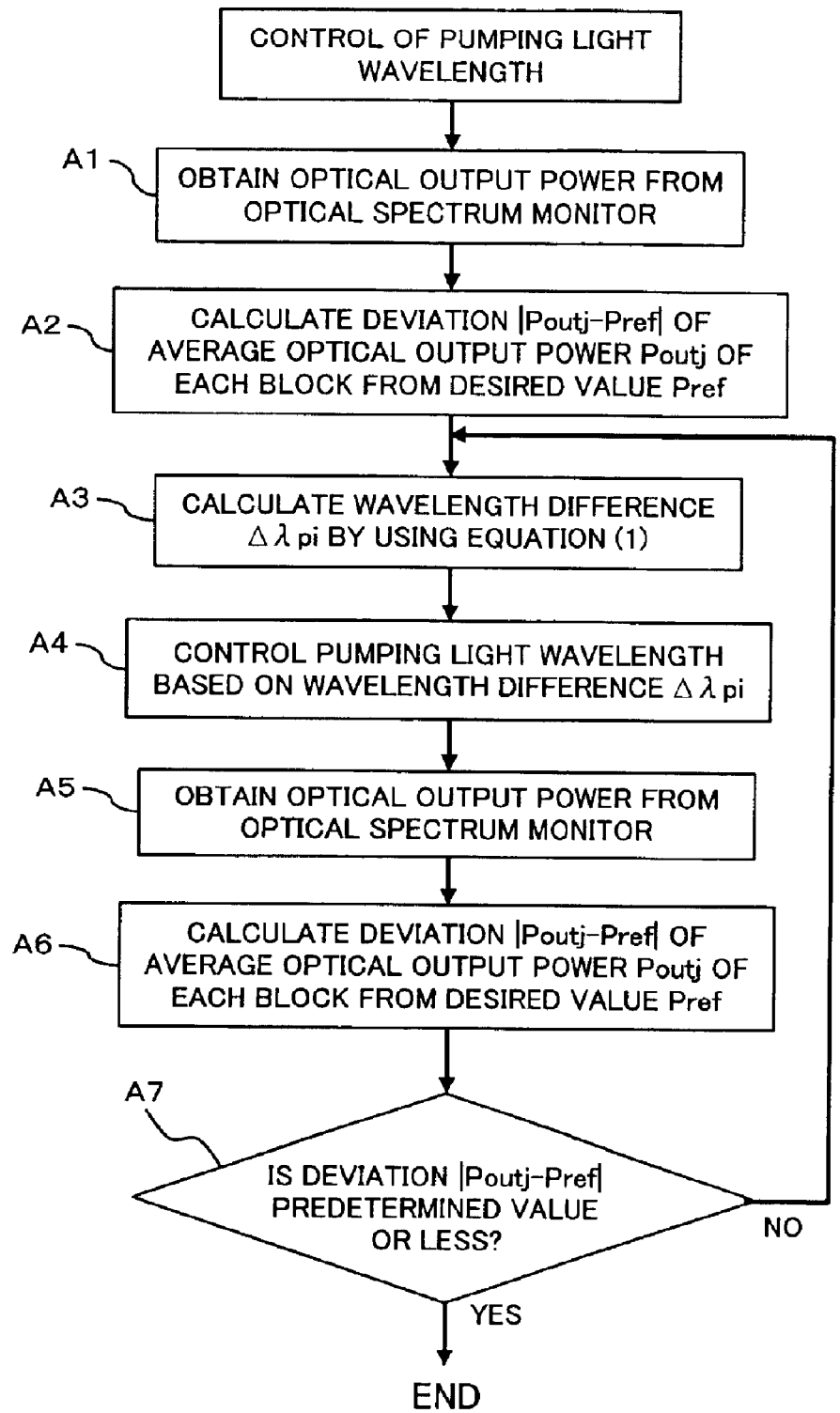
FIG. 8 is a flowchart for explaining processes of the pumping light wave length control (including the controlling method for the Raman amplifier) at the optical amplifier according to the embodiment of the present invention.

Next, referring to FIG. 8, the pumping light wavelength control (the control of the pumping light wavelength) is explained.

First, the computer 71 in the control section 7 reads (obtains) the optical output power being monitored every wavelength by the optical spectrum monitor 5 (step A1), and calculates the average value of the optical output power of each block (average optical output power) $P_{out1}$, $P_{out2}$, and $P_{out3}$ ($P_{outj}$: j is the block number). Still, in the case where the monitor is provided with the function calculating the average value, it is enough that the computer 71 reads only the calculated average value.

According to the embodiment of the present invention, in the case where the number of operating channels is equal to the number of allowable channels A or less, the signal light of the operating channels being disposed arbitrarily in the entire band is amplified by the Raman amplifying section 2. On the other hand, in the case where the number of operating channels becomes greater than the number of allowable channels A, the signal light of the operating channels contained within the band located out of the amplifying band of the rare earth element doped fiber amplifier is amplified by the Raman amplifying section 2. Therefore, the amplifying band (signal band) to be amplified by the Raman amplifying section 2 is different between the case where the number of operating channels is equal to the number of allowable channels A or less and the case where the number of operating channels becomes greater than the number of allowable channels A.

Therefore, in the case where the number of operating channels is equal to A or less, the average value of the optical output power from the optical spectrum monitor 5 of each block which the entire band is divided into is calculated. On the other hand, in the case where the number of operating channels becomes greater than A the average value of the optical output power from the optical spectrum monitor 5 of each block which the band located out of the amplifying band of the rare earth element doped fiber amplifier is divided into is calculated.

Next, the computer 71 reads the desired average optical output power (the desired value) $P_{ref}$ being set as the system set value, and calculates the deviations $|P_{out1}-P_{ref}|$, $|P_{out2}-P_{ref}|$, and $|P_{out3}-P_{ref}|$, ($|P_{outj}-P_{ref}|$:j is the block number) of the average optical output power $P_{out1}$, $P_{out2}$, and $P_{out3}$, ($P_{outj}$:j is the block number) of each of blocks 1, 2 and 3 from the desired average optical output power $P_{ref}$ (step A2).

Next, the computer 71 reads out the $B_{ij}$ (in some cases, the $B_{ij}$ is shown as [B]) from the memory, and by using the read $B_{ij}$ and the deviations $|P_{outj}-P_{ref}|$ calculated at the step A2, the computer 71 calculates the $\Delta\lambda_{pi}$ by using the equation (1) (step A3). Here, the $\Delta\lambda_{pi}$ is the wavelength difference for the pumping light wavelength set by the previous pumping light wavelength control, that is, the manipulated variable.

And the wavelength and power controller 72 controls the pumping light wavelength to be outputted from the wavelength variable pumping light source 23 in the Raman amplifying section 2, based on the $\Delta\lambda_{pi}$ calculated at the computer 71 (step A4). Further, in the case where the wavelength variable pumping light source 23 is a source to which relative values are inputted, the $\Delta\lambda_{pi}$ can be inputted as it is. On the other hand, in the case where the wavelength variable pumping light source 23 is a source to which absolute values are inputted, respective pumping light wavelength $\lambda_i$ is calculated, based on the $\lambda_{pi}$, and the calculated each pumping light wavelength $\lambda_i$ is inputted.

After the pumping light wavelength was controlled by the process mentioned above, further the computer 71 reads the optical output power being monitored every wavelength by the optical spectrum monitor 5 (step A5), and calculates the average values $P_{out1}$, $P_{out2}$, and $P_{out3}$ ($P_{outj}$:j is the block number) of the optical output power of each block. Further, when the monitor side is provided with a function calculating the average values, it is enough that the computer 71 only reads the calculated average values.

Next, the computer 71 reads the desired average optical output power $P_{ref}$ being set as the system set value, and calculates the deviations $|P_{out1}-P_{ref}|$, $|P_{out2}-P_{ref}|$, and $|P_{out3}-P_{ref}|$, ($|P_{outj}-P_{ref}|$:j is the block number) of the average optical output power $P_{out1}$, $P_{out2}$, and $P_{out3}$, ($P_{outj}$:j is the block number) of each of blocks 1, 2 and 3 from the desired average optical output power $P_{ref}$ (step A6).

Next, the computer 71 judges whether each of the deviations $|P_{outj}-P_{ref}|$ calculated at the step A6 is the predetermined value or less (step A7).

And in the case where all of the deviations $|P_{outj}-P_{ref}|$ were judged to be the predetermined value or less, the pumping light wavelength control ends.

On the other hand, in the case where any of the deviations $|P_{outj}-P_{ref}|$ was judged not to be the predetermined value or less, the process returns to the step A3 and the processes of the step A3 to A7 are executed.

The pumping light wavelength control by the control section 7 is repeated until the deviation $|P_{outj}-P_{ref}|$ of the average optical output power $P_{outj}$ of each block from the desired average optical output power $P_{ref}$ becomes the predetermined value or less.

Further, the pumping light wavelength control is repeated until the deviation $|P_{outj}-P_{ref}|$ of the average optical output power $P_{outj}$ of each block from the desired average optical output power $P_{ref}$ becomes the predetermined value or less. However, according to the embodiment of the present invention, the process is not limited to the process mentioned above. For example, the process can be repeated until any root mean square of the deviations $|P_{outj}-P_{ref}|$ becomes a predetermined value.

Further, at the explanation mentioned above, the pumping light wavelength control is executed by feedback control, however, according to the embodiment of the present invention, the control is not limited to this control. For example, the pumping light wavelength control mentioned above has been executed beforehand, a table in which the pumping light wavelengths are corresponded to the number of operating channels and the disposition of the operating channels is arranged, and the table is stored in the memory of the computer 71. And the computer 71 obtains the number of operating channels and the disposition of the operating channels from monitoring control light and sets the pumping light wavelength by referring to the table storing in the memory (feed forward control) This control is also possible.

Figure 9:
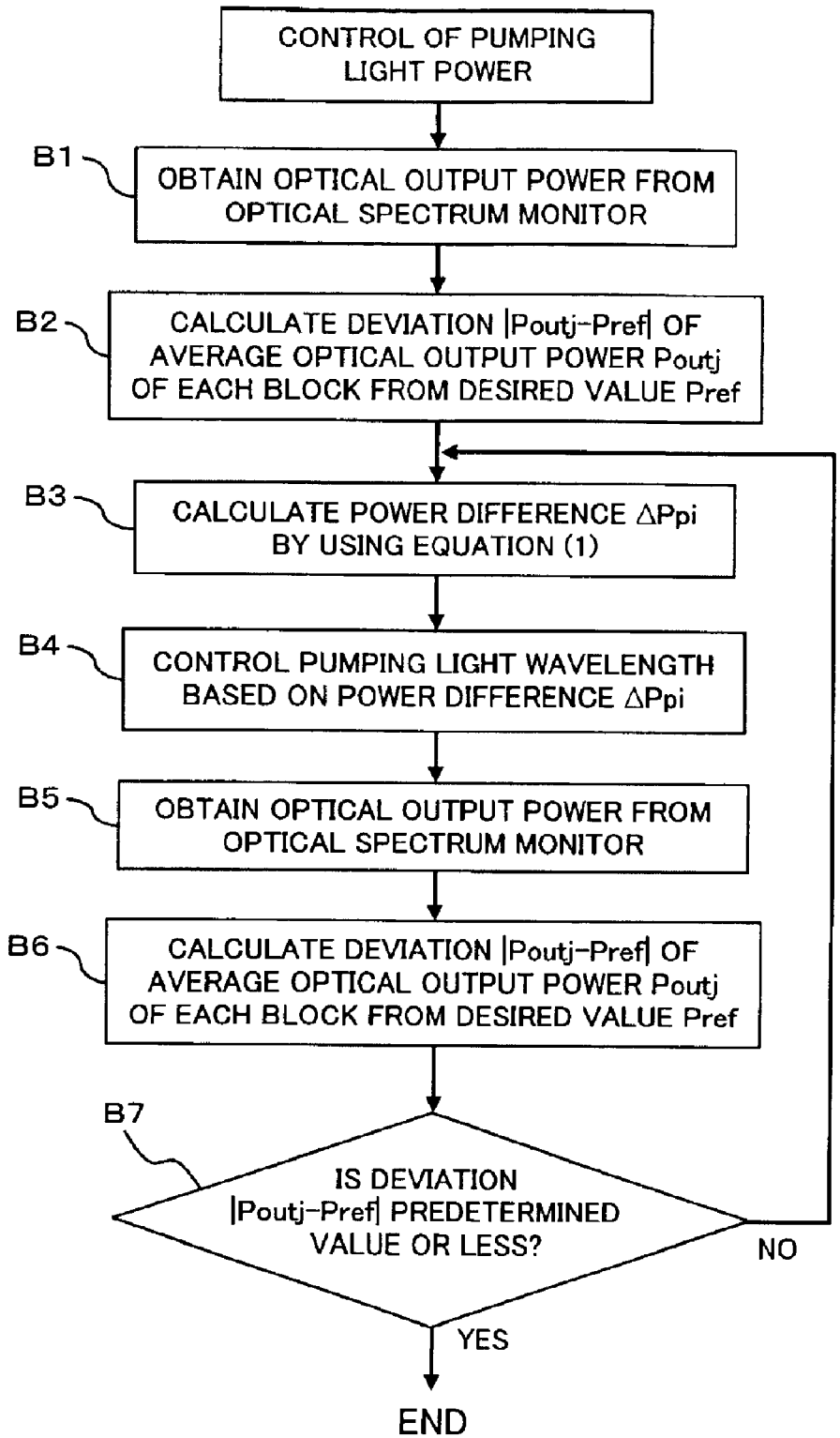
FIG. 9 is a flowchart for explaining processes of the pumping light power control (including the controlling method for the Raman amplifier) at the optical amplifier according to the embodiment of the present invention.

Next, referring to FIG. 9, the pumping light power control (the control of the pumping light power) is explained.

First, the computer 71 in the control section 7 reads (obtains) the optical output power being monitored every wavelength by the optical spectrum monitor 5 (step B1), and calculates the average value of the optical output power of each block (average optical output power) $P_{out1}$, $P_{out2}$, and $P_{out3}$ ($P_{outj}$:j is the block number). Further, in the case where the monitor is provided with the function calculating the average value, it is enough that the computer 71 reads only the calculated average value.

According to the embodiment of the present invention, in the case where the number of operating channels is equal to the number of allowable channels A or less, the signal light of the operating channels being disposed arbitrarily in the entire band is amplified by the Raman amplifying section 2. On the other hand, in the case where the number of operating channels becomes greater than the number of allowable channels A, the signal light of the operating channels contained within the band located out of the amplifying band of the rare earth element doped fiber amplifier is amplified by the Raman amplifying section 2. Therefore, the amplifying band (signal band) to be amplified by the Raman amplifying section 2 is different between the case where the number of operating channels is equal to the number of allowable channels A or less and the case where the number of operating channels becomes greater than the number of allowable channels A.

Therefore, in the case where the number of operating channels is equal to A or less, the average value of the optical output power from the optical spectrum monitor 5 of each block which the entire band is divided into is calculated. On the other hand, in the case where the number of operating channels becomes greater than A, the average value of the optical output power from the optical spectrum monitor 5 of each block which the band located out of the amplifying band of the rare earth element doped fiber amplifier is divided into is calculated.

Next, the computer 71 reads the desired average optical output power (the desired value) $P_{ref}$ being set as the system set value, and calculates the deviations $|P_{out1}-P_{ref}|$, $|P_{out2}-P_{ref}|$, and $|P_{out3}-P_{ref}|$, ($|P_{outj}-P_{ref}|$:j is the block number) of the average optical output power $P_{out1}$, $P_{out2}$, and $P_{out3}$, ($P_{outj}$:j is the block number) of each of blocks 1, 2 and 3 from the desired average optical output power $P_{ref}$ (step B2).

Next, the computer 71 reads out the $A_{ij}$ (in some cases, the $A_{ij}$ is shown as [A]) from the memory, and by using the read $A_{ij}$ and the deviation $|P_{outj}-P_{ref}|$ calculated at the step B2, the computer 71 calculates the $\Delta P_{pi}$ by using the equation (2). Here, the $\Delta P_{pi}$ is the power difference for the pumping light power set by the previous pumping light power control, that is, the manipulated variable (step B3).

And the wavelength and power controller 72 controls the pumping light power to be outputted from the wavelength variable pumping light source 23 in the Raman amplifying section 2, based on the $\Delta P_{pi}$ calculated at the computer 71 (step B4). Further, in the case where the wavelength variable pumping light source 23 is a source to which relative values are inputted, the $\Delta P_{pi}$ can be inputted as it is. On the other hand, in the case where the wavelength variable pumping light source 23 is a source to which absolute values are inputted, respective pumping light power $P_i$ is calculated, based on the $\Delta P_{pi}$, and the calculated each pumping light power $P_i$ is inputted.

After the pumping light power was controlled by the process mentioned above, further the computer 71 reads (obtains) the optical output power being monitored every wavelength by the optical spectrum monitor 5 (step B5), and calculates the average values $P_{out1}$, $P_{out2}$, and $P_{out3}$, ($P_{outj}$:j is the block number) of the optical output power of each block. Further, when the monitor side is provided with a function calculating the average values, it is enough that the computer 71 only reads the calculated average values.

Next, the computer 71 reads the desired average optical output power $P_{ref}$ being set as the system set value, and calculates the deviations $|P_{out1}-P_{ref}|$, $|P_{out2}-P_{ref}|$, and $|P_{out3}-P_{ref}|$, ($|P_{outj}-P_{ref}|$:j is the block number) of the average optical output power $P_{out1}$, $P_{out2}$, and $P_{out3}$, ($P_{outj}$:j is the block number) of each of blocks 1, 2 and 3 from the desired average optical output power $P_{ref}$ (step B6).

Next, the computer 71 judges whether each of the deviations $|P_{outj}-P_{ref}|$ calculated at the step B6 is the predetermined value or less (step B7).

And in the case where all of the deviations $|P_{outj}-P_{ref}|$ were judged to be the predetermined value or less, the pumping light power control ends.

On the other hand, in the case where any of the deviations $|P_{outj}-P_{ref}|$ was judged not to be the predetermined value or less, the process returns to the step B3 and the processes of the step B3 to B7 are executed.

The pumping light power control by the control section 7 is repeated until the deviation $|P_{outj}-P_{ref}|$ of the average optical output power $P_{outj}$ of each block from the desired average optical output power $P_{ref}$ becomes the predetermined value or less.

Further, the pumping light power control is repeated until the deviation $|P_{outj}-P_{ref}|$ of the average optical output power $P_{outj}$ of each block from the desired average optical output power $P_{ref}$ becomes the predetermined value or less. However, according to the embodiment of the present invention, the process is not limited to the process mentioned above. For example, the process can be repeated until any root mean square of the deviations $|P_{outj}-P_{ref}|$ becomes a predetermined value.

Further, at the explanation mentioned above, the pumping light power control is executed by feedback control, however, according to the embodiment of the present invention, the control is not limited to this control. For example, the pumping light power control mentioned above has been executed beforehand, a table in which the pumping light wavelengths are corresponded to the number of operating channels and the disposition of the operating channels is arranged, and the table is stored in the memory of the computer 71. And the computer 71 obtains the number of operating channels and the disposition of the operating channels from monitoring control light and sets the pumping light power by referring to the table storing in the memory (feed forward control). This control is also possible.

Therefore, according to the optical amplifier and the controlling method for the Raman amplifier according to the embodiment of the present invention, the pumping light power can be reduced at the time when the number of operating channels is small such as at the initial installation time, further the pumping light source cost occupying the greater part of the optical amplifier can be reduced, consequently the present invention has the advantages mentioned above.

Figure 10:
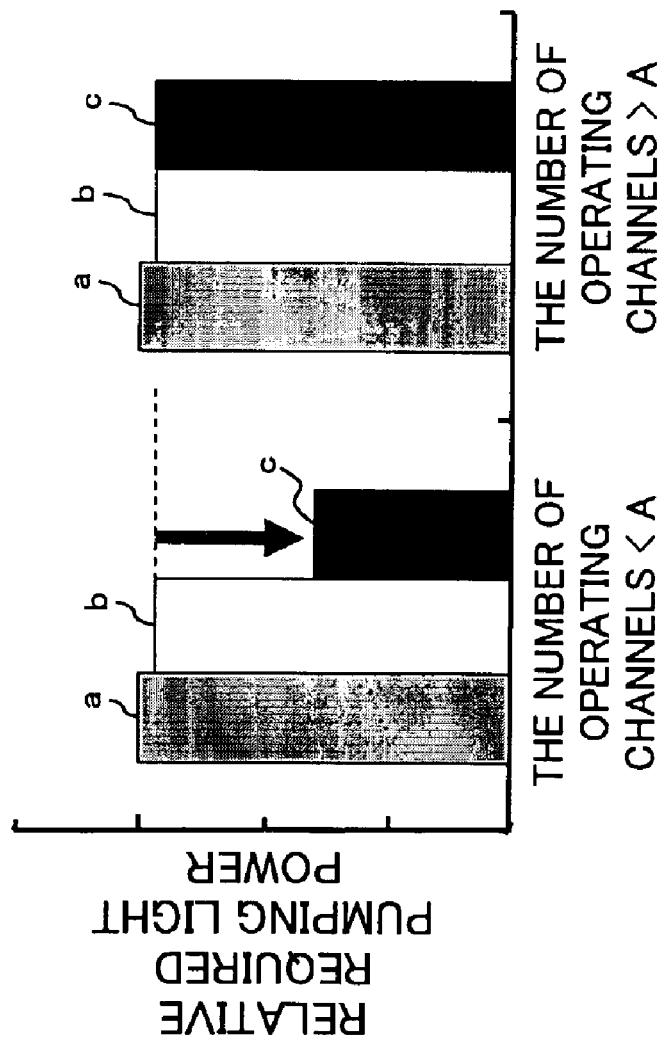
FIG. 10 is a graph for explaining an effect of the optical amplifier according to the embodiment of the present invention.
Figure 11:
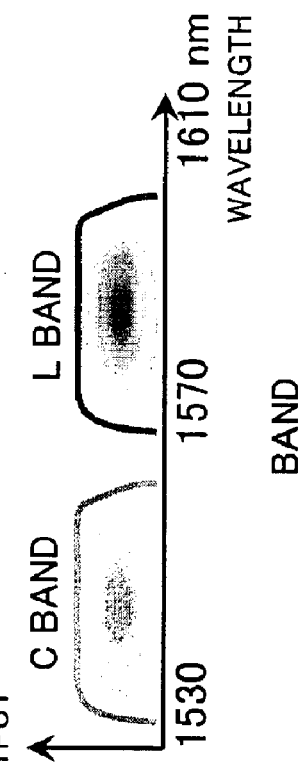
FIGS. 11(a) and (b) is a schematic view for explaining optical amplifier in general use, FIG. 11 (a) showing the construction thereof, and FIG. 11(b) showing the amplifying band.
Figure 11:
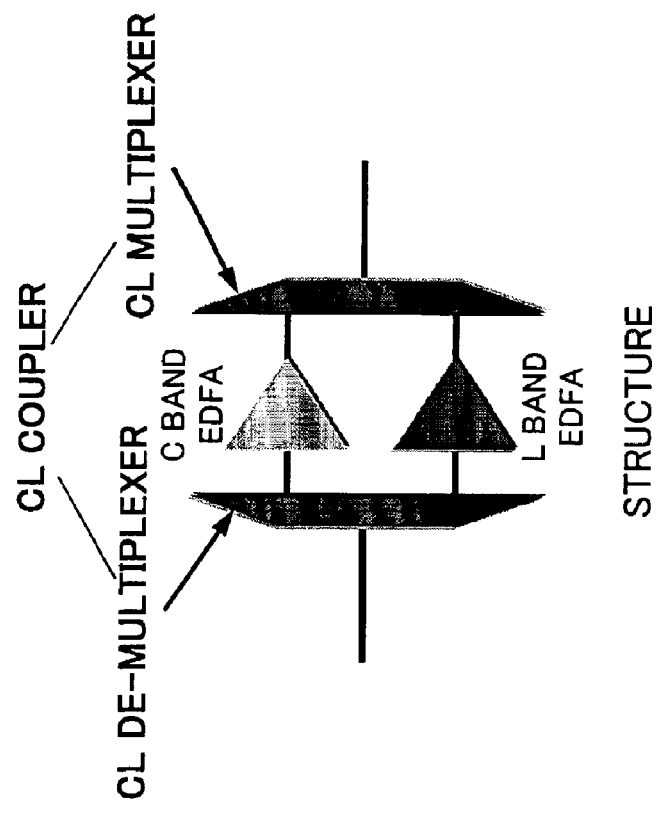

FIG. 10 is a drawing showing the relation between the number of operating channels and the relative required pumping light power, wherein there is performed a comparison among optical amplifiers shown by "a", "b", and "c", i.e. the optical amplifier according to the embodiment of the present invention (an EDFA is used as the rare earth element doped fiber amplifier) (shown by "c"); a Raman optical amplifier having a general structure (shown by "a");, and an optical amplifier (hybrid optical amplifier) being composed of a Raman amplifier and a rare earth element doped fiber amplifier (EDFA) (shown by "b");. Further, the relative required pumping light power is shown as a ratio for pumping light power to be installed in a Raman amplifier having a general structure.

As shown in FIG. 10, the Raman amplifier having the general structure basically installs pumping light power requiring at the case where the number of operating channels is the largest, therefore, the installing pumping light power is constant without depending on the number of operating channels. The hybrid optical amplifier has the EDFA installed from the initial installation time, therefore, the installing pumping light power becomes almost constant without depending on the number of operating channels.

On the other hand, the optical amplifier according to the embodiment of the present invention has a rare earth element doped fiber amplifying section (for example, an EDFA) installed in the case where the number of operating channels becomes greater than the number of allowable channels A. And the control section 7 relocates the pumping wavelength of the Raman amplifying section, therefore, in the case where the number of operating channels is small such as at the initial installation time (for example, at the case where the number of operating channels is equal to the number of allowable channels A or less), it is not necessary to install the rare earth element doped fiber amplifying section (for example, the EDFA), consequently, the pumping light power for the rare earth element doped fiber amplifying section can be reduced, and the cost of the pumping light source can be also reduced.

Moreover, according to the embodiment of the present invention, the wavelength variable pumping light source 23 is used as the pumping light source of the Raman amplifying section 2, and the most suitable pumping light power and the most suitable pumping light wavelength are obtained corresponding to the disposition of the operating channels (wavelength of the signal light) by executing the pumping light power control and the pumping light wavelength control. Therefore, the pumping light power as well as the cost of the pumping light source can be further reduced. Furthermore, by adopting the structure, in which the pumping light source in the Raman amplifying section is added corresponding to the addition of the number of operating channels, at the time when the number of operating channels is small, the pumping light power and the cost of pumping light source can be further reduced.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An optical amplifier, comprising:
a rare earth doped fiber amplifying section to be disposed in the case where a number of operating channels exceeds a number of allowable channels A;
a Raman amplifying section being capable of amplifying signal light of an entire band being composed of an amplifying band of the rare earth doped fiber amplifying section and a band, which can have a number of allowable channels A, located out of said number of allowable channels A, located out of said amplifying band; and
a control section;
controlling wavelength of pumping light of said Raman amplifying section such that the signal light of said entire band is amplified by said Raman amplifying section, without amplification of said amplifying band being provided by the rare earth doped fiber amplifying section, in the case where the number of operating channels is equal to that of allowable channels A or less, and
controlling the wavelength of pumping light of said Raman amplifying section such that the signal light of the band located out of said amplifying band, but not the entire band, is amplified by said Raman amplifying section, and amplification of said amplifying band is provided by the rare earth doped fiber amplifier, in the case where the number of operting channels becomes greater than the number of allowable channels A.

2. The optical amplifier according to claim 1, further comprising:
switches enabling to make the connections of said rare earth doped fiber amplifying section.

3. The optical amplifier according to claim 1, wherein said band located out of said amplifying band of said rare earth doped fiber amplifying section is a band on a short wavelength side being adjacent to said amplifying band of said rare earth doped fiber amplifying section.

4. The optical amplifier according to claim 1,
wherein said rare earth doped fiber amplifying section is an erbium doped fiber amplifier,
said amplifying band of said rare earth doped after amplifying section is a C band or L band, and
said located out of said amplifying band of said rare doped fiber amplifying section is a band of short wavelength side being adjacent to said C band or said L band.

5. The optical amplifier according to claim 1, wherein said Raman amplifying section comprises:
a wavelength variable pumping light source.

6. The optical amplifier according to claim 1,
wherein said control section is configured to change the wavelength of pumping light of said Raman amplifying section based on the wavelength of the signal light of an operating channel included in the band located out of said amplifying band of said rare earth doped fiber amplifying section, in the case where the number of operating channels becomes greater than the number of allowable channels A.

7. The optical amplifier according to claim 1, wherein said control section is configured to control the wavelength of pumping light of said Raman amplifying section based on optical output power of said entire band, in the case where the number of operating channels is equal to that of allowable channels A or less, whereas said control section is configured to control the wavelength of pumping light of said Raman amplifying section based on optical output power of the band located out of said amplifying band of said rare earth doped fiber amplifying section, in the case where the number of operating channels becomes greater than the number of allowable channels A.

8. The optical amplifier according to claim 7, wherein, in the case where the number of operating channels is equal to that of allowable channels A or less,
said control section is configured to control the wavelength of pumping light of said Raman amplifying section until there exists any deviation, becoming not more than a predetermined value, of average optical output power of each of blocks, which said entire band is divided into, from desired optical output power, whereas, in the case where the number of operating channels becomes greater than the number of allowable channels A, said control section controls the wavelength of pumping light of said Raman amplifying section until there exists any deviation, becoming not more than a predetermined value, of average optical output power of each of blocks, which the band located out of said amplifying band of said rare earth element doped fiber amplifying section is divided into, from desired optical output power.

9. The optical amplifier according to claim 7, wherein, in the case where the number of operating channels is equal to that of allowable channels A or less, said control section is configured to control the wavelength of pumping light of said Raman amplifying section until there exists any root mean square of deviations, becoming not more than a predetermined value, of average optical output power of each of blocks, which said entire band is divided into, from desired optical output power, whereas in the case where the number of operating channels becomes greater than the number of allowable channels A, said control section controls the wavelength of pumping light of said Raman amplifying section, until there exists any root mean square of deviations, becoming not more than a predetermined value, of average optical output power of each of blocks, which the band located out of said amplifying band of said rare earth element doped fiber amplifying section is divided into, from desired optical output power.

10. The optical amplifier according to claim 1 wherein said control section is configured to control the pumping light power of said Raman amplifying section based on optical output power of said entire band, in the case where the number of operating channels is equal to that of allowable channels A or less, whereas said control section is configured to control the pumping light power of said Raman amplifying section based on optical output power of the band located out of said amplifying band of said rare earth doped fiber amplifying section, in the case where the number of operating channels becomes greater than the number of allowable channels A.

11. The optical amplifier according to claim 10,
wherein in the case where the number of operating channels is equal to that of allowable channels A or less, said control section is configured to control the pumping light power of said Raman amplifying section until there exists any root mean square of deviations, becoming not more than a predetermined value, of average optical output power of each of blocks, which said entire band is divided into, from desired optical output power, whereas, in the case where the number of operating channels becomes greater than the number of allowable channels A, said control section controls the pumping light power of said Raman amplifying section until there exists any root mean square of deviations, becoming not more than a predetermined value, of average optical output power of each of blocks, which the band located out of said amplifying band of said rare earth element doped fiber amplifying section is divided into, from desired optical output power.

12. The optical amplifier according to claim 10, wherein in the case where the number of operating channels is equal to that of allowable channels A or less, said control section is configured to control the pumping light power of said Raman amplifying section until there exists any deviation of root mean square, becoming not more than a predetermined value, of average optical output power of each of blocks, which said entire band is divided into, from desired optical output power, whereas in the case where the number of operating channels becomes greater than the number of allowable channels A, said control section controls the pumping light power of said Raman amplifying section, until there exists any deviation, becoming not more than a predetermined value, of average optical output power of each of blocks, which the band located out of said amplifying band of said rare earth element doped fiber amplifying section is divided into, from desired optical output power.

13. A controlling method for a Raman amplifier being capable of amplifying signal light of the entire band being composed of an amplifying band of a rare earth element doped fiber amplifier and a band, which can have the number of allowable channels A, located out of said amplifying band, said method comprising:

controlling wavelength of pumping light of said Raman amplifier such that the signal light of said entire band is be amplified by said Raman amplifier, without amplification of said amplifying band being provided by the rare earth doped fiber amplifier, in the case where the number of operating channels is equal to that of allowable channels A or less; and controlling the wavelength of pumping light of said Raman amplifier such that the signal light of the band located out of said amplifying band but not the entire band, is amplified by said Raman amplifier, and amplification of said amplifying band is provided by the rare earth doped fiber amplifier, in the case where the number of operating channels becomes greater than the number of allowable channels A.

14. An optical amplifier comprising:

a rare earth doped fiber amplifying section in which a rare earth doped fiber amplifier can be disposed;

a Raman amplifying section being capable of amplifying light in an amplifying band that said rare earth doped fiber amplifier can amplify and light in an adjacent band located outside the amplifying band, the adjacent band being capable of locating A channels; and a pumping light source supplying pumping light to said Raman amplifying section and capable of changing wavelength of the pumping light, wherein in the case where a number of operating channels is equal to or less than A, the wavelength of the pumping light is controlled such that light within the amplifying band and the adjacent band is amplified by said Raman amplifying section, without amplification of the amplifying band by the rare earth doped fiber amplifier, and in the case where the number of operating channels is greater than A, the wavelength of the pumping light is controlled such that light within the adjacent band, but not the amplifying band is provided by the rare earth doped fiber amplifier.

15. The optical amplifier according to claim 14, further comprising:

switches enabling to make connections of said rare earth doped fiber amplifying section.

16. The optical amplifier according to claim 14, wherein the adjacent band is a band on a short wavelength side of the amplifying band.

17. The optical amplifier according to claim 14, wherein the wavelength of pumping light is controlled based on optical output power of the amplifying band and the adjacent band, in the case where the number of operating channels is equal to or less than A, and the wavelength of pumping light controlled based on optical output power of the adjacent band, in the case where the number of operating channels is greater than A.

18. An apparatus comprising:

a Raman amplifier capable of amplifying signal light of an entire band being composed of an amplifying band of a rare earth doped fiber amplifier and a band, which can have the number of allowable channels A, located out of the amplifying band of the rare earth doped fiber amplifier, in accordance with Raman pumping light;

means for controlling wavelength of the pumping light such that signal light of the entire band is amplified by the Raman amplifier, without amplification of the amplifying band being provided by the rare earth doped fiber amplifier, when a number of operating channels is equal to that of allowable channels A or less; an means for controlling the wavelength of pumping light such that the signal light of the band located out of the amplifying band of the rare earth doped fiber amplifier, but not the amplifying band, is amplified by the Raman amplifier, and amplification of the amplifying band of the rare earth doped fiber amplifier is provided by the rare earth doped fiber amplifier; when the number of operating channels becomes greater than the number of allowable channels A.

19. A method comprising:

providing a Raman amplifier to amplify a signal light having a number of operating channels in accordance with Raman pumping light of the Raman amplifier, the Raman amplifier capable of amplifying light in an amplifying band of a rare earth doped fiber amplifier and light in an adjacent band located outside the amplifying band, the adjacent band being capable of locating A channels;

when the number of operating channels of the signal light is equal to or less than A, controlling wavelength of the Raman pumping light so that signal light within the amplifying band and the adjacent band is amplified by the Raman amplifier, without amplifying the signal light by the rare earth doped fiber amplifier; and when the number of operating channels of the signal light is greater than A, controlling wavelength of the Raman pumping light so that signal light within the adjacent band, but not the amplifying band, is amplified by the Raman amplifier, and amplifying signal light within the amplifying band by the rare earth doped fiber amplifier.

20. A method as in claim 19, further comprising:

when the number of operating channels of the signal light is greater than A, controlling the wavelength of the pumping light, and amplifying the light within the amplifying band by the rare earth doped fiber amplifier, so that a power deviation of the amplifier signal light across both the amplifying band and the adjacent band is equal to a predetermined value or less.

21. An apparatus comprising:

a Raman amplifier to amplify a signal light having a number of operating channels in accordance with Raman pumping light of the Raman amplifier, the Raman amplifier capable of amplifying light in an amplifying band of a rare earth doped fiber amplifier and light in an adjacent band located outside the amplifying band, the adjacent band being capable of locating A channels;

means, when the number of operating channels of the signal light is equal to or less than A, for controlling wavelength of the Raman pumping light so that signal light within the amplifying band and the adjacent band is amplified by the Raman amplifier, without amplifying the signal light by the rare earth doped fiber amplifier; and means, when the number of operating channels of the signal light is greater than A, for controlling wavelength of the Raman pumping light so that signal light within the adjacent band, but not the amplifying band, is amplified by the Raman amplifier, and for amplifying signal light within the amplifying band by the rare earth doped fiber amplifier.

22. An apparatus comprising: an optical amplifier comprising a Raman amplifier section amplifying a signal light having a number of operating channels in accordance with Raman pumping light of the Raman amplifier section;

a rare earth doped fiber amplifier section having an amplifying band, wherein the Raman amplifier section is capable of amplifying light in the amplifying band and light in an adjacent band located outside the amplifying band, the adjacent band is capable of locating A channels, the rare earth doped fiber amplifier section is provided when the number of operating channels of the signal light greater than A, and, when the number of operating channels of the signal light is greater than A, the rare earth doped fiber amplification amplifies signal light within th amplifying band; and a controller which when the number of operating channels of the signal light is equal to or less than A, controls wavelength of the Raman pumping light so that signal light within the amplifying band and the adjacent band if amplified by the Raman amplifier section, without amplifying the signal light by the rare earth doped fiber amplifier section, and when the number of operating channels of the signal light is greater th A controls wavelength of the Raman pumping light so that signal light within the adjacent band, but not the amplifying band, is amplified by the Raman amplifier section.

23. A method as in claim 19, wherein the Raman amplifier is set to provide sufficient amplification to A channels or less, but not more than A channels.

24. An apparatus as in claim 21, wherein the Raman amplifier is set to provide sufficient amplification to A channels or less, but not more than A channels.

25. An apparatus as in claim 22, wherein the Raman amplifier is set to provide sufficient amplification to A channels or less, but not more than A channels.

* * * * *

UNITED STATES PATENT AND TRADEMARK OFFICE
CERTIFICATE OF CORRECTION

| | |
|---|---|
| PATENT NO. | : 7,095,553 B2 |
| APPLICATION NO. | : 10/895315 |
| DATED | : August 22, 2006 |
| INVENTOR(S) | : Etsuko Hayashi |

It is certified that error appears in the above-identified patent and that said Letters Patent is hereby corrected as shown below:

Col. 17, lines 12-13, after "channels A," delete "located out of said number of allowable channels A,".
Col. 17, line 15, after "section" delete ";".
Col. 17, line 30, delete "operting" and insert --operating--, therefor.
Col. 17, line 35, after "make" delete "the".
Col. 17, line 45, delete "after" and insert --fiber--, therefor.
Col. 17, line 46, after "or" insert --an--.
Col. 17, line 47, insert --band-- before "located", and after "rare" insert --earth--.
Col. 17, line 48, delete "of" and insert --on a--, therefor.
Col. 17, line 56, delete "on the" and insert --on a--.

Col. 18, line 24, after "earth" delete "element".
Col. 18, line 43, delete "element" before "doped".

Col. 19, line 7, after "earth" delete "element".
Col. 19, line 25, after "earth" delete "element".
Col. 19, line 29, delete "the" and insert --an--, therefor.
Col. 19, line 30, after "earth" delete "element".
Col. 19, line 36, after "is" delete "be".
Col. 19, line 43, after "band" insert --,--.

Col. 20, line 2, after "band" insert --, is amplified by said Raman amplifying section, and amplification of the amplifying band--.
Col. 20, line 32, delete "an" and insert --and--, therefor.
Col. 20, line 39, delete "amplifier;" and insert --amplifier,--.

Col. 21, line 3, delete "amplifier" and insert --amplified--.

Col. 22, line 7, after "lights" insert --is--.
Col. 22, line 9, delete "amplification" and insert --amplifier section--, therefor.
Col. 22, line 10, delete "th" and insert --the--, therefor.
Col. 22, line 14, delete "if" and insert --is--, therefor.
Col. 22, line 15, after "the Raman" insert -- amplifier section, without amplifying the signal light by the rare earth doped fiber amplifying section, and--.
Col. 22, lines 16-17, delete "amplifier section, without amplifying the signal light by the rare earth doped fiber amplifying section, and".

UNITED STATES PATENT AND TRADEMARK OFFICE
CERTIFICATE OF CORRECTION

PATENT NO. : 7,095,553 B2
APPLICATION NO. : 10/895315
DATED : August 22, 2006
INVENTOR(S) : Etsuko Hayashi It is certified that error appears in the above-identified patent and that said Letters Patent is hereby corrected as shown below:

Col. 22, line 19, delete "th A" and insert --than A,-- , therefor.

Signed and Sealed this

Eighteenth Day of December, 2007

JON W. DUDAS
*Director of the United States Patent and Trademark Office*